(12) United States Patent
Parker et al.

(10) Patent No.: US 9,565,866 B2
(45) Date of Patent: Feb. 14, 2017

(54) METHOD OF PREPARING ACID STABLE CARAMEL

(75) Inventors: Owen Parker, Louisville, KY (US); Gregory Kreder, Prospect, KY (US)

(73) Assignee: D.D. Williamson & Co., Inc., Louisville, KY (US)

( * ) Notice: Subject to any disclaimer, the term of this patent is extended or adjusted under 35 U.S.C. 154(b) by 925 days.

(21) Appl. No.: 12/488,192

(22) Filed: Jun. 19, 2009

(65) Prior Publication Data

US 2010/0003383 A1    Jan. 7, 2010

Related U.S. Application Data

(60) Provisional application No. 61/077,951, filed on Jul. 3, 2008.

(51) Int. Cl.
*A23B 7/157* (2006.01)
*A23G 3/32* (2006.01)

(52) U.S. Cl.
CPC .. *A23G 3/32* (2013.01); *A23L 5/48* (2016.08)

(58) Field of Classification Search
CPC ............... A23G 3/32; A23L 5/00; A23L 5/48
USPC ....................................................... 426/540
See application file for complete search history.

(56) References Cited

U.S. PATENT DOCUMENTS

| | | | |
|---|---|---|---|
| 2,582,261 A | | 1/1952 | Longenecker |
| 2,767,108 A | | 10/1956 | Fetzer |
| 2,784,118 A | † | 3/1957 | Pyle |
| 3,214,294 A | * | 10/1965 | Meisel ............................ 127/34 |
| 3,385,733 A | * | 5/1968 | Ackermann ................... 127/34 |
| 3,618,588 A | * | 11/1971 | Anwar et al. .................. 127/34 |
| 4,138,271 A | † | 2/1979 | Ohira |
| 4,366,173 A | | 12/1982 | Parker |
| 4,416,700 A | | 11/1983 | Clark et al. |
| 4,614,662 A | † | 9/1986 | Ramaswamy |
| 4,784,696 A | | 11/1988 | Ramaswamy |
| 5,587,439 A | | 12/1996 | DiMaio |

FOREIGN PATENT DOCUMENTS

EP          212049 A2       3/1987

OTHER PUBLICATIONS

International Search Report and Written Opinion, PCT/US 09/48796, mailed Jul. 31, 2009.
W. Kamuf et al., Overview of Caramel Colors, Cereal Foods World, Publication No. W-2003-0205-01F, American Association of Cereal Chemists, Inc., March-April, vol. 48 No. 2, 2003.
Extended European Search Report, dated Apr. 3, 2013.
European Patent Office; Office Action in European Patent Application No. 09774174.8 dated Mar. 9, 2016; 5 pages.
Response to European Patent Office Action in European Patent Application No. 09774174.8, dated May 17, 2016.

* cited by examiner
† cited by third party

*Primary Examiner* — Erik Kashnikow
*Assistant Examiner* — Lela S Williams
(74) *Attorney, Agent, or Firm* — Wood Herron & Evans LLP

(57) ABSTRACT

Class IV caramel color with reduced 4-MeI content is formed by combining carbohydrate with ammonium bisulfite and acid in an amount effective to establish a pH of less than 5. This is heated in a closed reactor vessel and heated to a temperature and for a time effective to provide the desired intensity caramel color. A base is injected into the closed reaction vessel during heating to control the caramelization reaction.

13 Claims, No Drawings

METHOD OF PREPARING ACID STABLE CARAMEL

RELATED APPLICATION

This application is related to and claims the benefit of U.S. Provisional Patent Application Ser. No. 61/077,951, filed Jul. 3, 2008, the disclosure of which is incorporated herein by reference.

BACKGROUND OF THE INVENTION

Caramel is one of the primary color components added to food products. Due to the wide variety of food products, a wide variety of different caramels are required. There are four general classifications of caramel. Caramel color I, also known as plain or spirit caramel, is formed without ammonia or sulfite compounds. Caramel color II, also referred to as caustic sulfite caramel, is formed with sulfite compounds and without ammonium compounds. Caramel color III, also referred to as ammonia or beer caramel, as well as bakers' or confectioners' caramel, is formed with ammonium compounds and without sulfite compounds. And, finally, caramel color IV, also known as sulfite ammonia, or soft drink caramel, or acid proof caramel, utilizes both ammonia and sulfite in the production of the caramel. Due to stability, caramel color I should not be used, for example, in a soft drink, and, likewise, caramel color IV would not be utilized in beer.

In any caramel color that utilizes ammonia as a reactant, there is an issue with the production of 4-methylimidazole, also referred to as 4-MeI. It is generally preferable to form a caramel product that has as little 4-MeI as possible. Caramel color I and II do not require any special steps to eliminate 4-MeI because ammonia is not employed. Because the method used to form caramel color III is different than the method used to make caramel color IV, methods to avoid formation of 4-MeI in caramel color III are not applicable to class IV caramels.

SUMMARY OF THE INVENTION

The present invention is premised on the realization that the 4-MeI content in class IV caramel can be reduced by establishing the initial pH of the reactant solution to less than 5 and, preferably, 4.5 or less. The reactant mixture of carbohydrate, ammonium bisulfite, acid and water is then heated in a closed vessel to a temperature and for a time sufficient to initiate the caramel reaction. The rate of the reaction is then controlled by subsequently adding base in a controlled manner to maintain a desired low pH, but not so low as to allow the caramelization reaction to run away.

The objects and advantages of the present invention will be further appreciated in light of the following detailed description and drawings in which:

DETAILED DESCRIPTION

Class IV caramel is formed by reacting a carbohydrate with ammonium bisulfite and water at an initial pH of less than 5 and, preferably, less than 4.5. A wide variety of different carbohydrate sources can be used in practicing the present invention. These may include sucrose and glucose. The use of glucose has the advantage of reducing the amount of ammonia required in the reaction which thus decreases the amount of 4-MeI ultimately produced. Generally, the carbohydrate source will have a high dextrose equivalent, generally 70-85, and a Baumé of about 70-80. A typical carbohydrate source is corn- or wheat-derived glucose, generally having a DE of 80.

The catalyst employed in the present invention is ammonium bisulfite. Generally, ammonium bisulfite is obtained in an aqueous solution containing 60-70% ammonium bisulfite. Ammonium bisulfite solutions have various ratios of ammonium to sulfite. Generally, a molar ratio of 1 ammonia to 3 sulfites provides a stable solution. Generally any excess sulfite is present as sulfurous acid. The ammonium bisulfite solution typically has a pH ranging from 5.3 to 5.9, generally about 5.5.

The starting reactant blend will also include an acid in an amount effective to establish the desired pH range, as discussed below. Generally, an inorganic acid is preferred, and, in particular, one which will not contribute off taste to the formed caramel. Suitable acids are sulfuric acid, sulfurous acid, sodium metabisulfite and phosphorous based acids, in particular phosphorus and phosphoric acid. Phosphoric acid is a generally accepted food grade component which provides no off tastes.

To initiate the reaction, the carbohydrate source is blended with water. The water simply insures that the end product has a desired specific gravity. Alternately, water can be added at the end of the reaction. The carbohydrate solution will generally be at about 150° F. to avoid crystallization of the sugars.

Acid is added in an amount sufficient to establish the desired pH of the carbohydrate catalyst blend prior to heating the blend above about 150° F., in other words, prior to caramelization reaction. The desired pH should be less than 5, more particularly less than 4.5, with a range of 2-4 particularly suited for use in the present invention.

The ammonium bisulfite is added to the carbohydrate. The amount of ammonium bisulfite added on a solids basis ranges from 4% to 32%, in particular 17-32% for double strength color. The amount of ammonium bisulfite solids per solids carbohydrate is adjusted to effect color formation. Higher concentrations of the catalyst lead to more intense caramel color.

All of these components are blended together in a stainless steel reaction vessel. The reaction vessel includes an internal agitator and steam coils. After the above components are combined in the reaction vessel, the blend is heated to 180° F. and the reaction vessel is sealed. The blend is further heated to about 250° F. at autogenous pressure.

This will initiate the caramelization reaction, which will, in turn, cause the pH to lower. If the reaction continues in an uncontrolled manner even at 250° F., there is a strong possibility that the reaction will, in effect, become uncontrolled and a solid mass of insoluble caramel formed. However, the reaction must be continued long enough to obtain a caramel color with a sufficiently intense color.

Accordingly, once the temperature reaches 250° F., base is added under pressure to control the reaction rate. Generally, the base is injected into the reaction vessel in an amount effective to control the speed of color formation. Suitable bases include potassium hydroxide, sodium hydroxide, ammonium hydroxide, and mixtures thereof. These are added in solution (KOH 40-50%, NaOH 32-50%, $NH_4OH$ 20-33%) over 30 to 45 minutes. The reaction temperature is maintained at 250-280° F. until the desired color is developed. The reaction temperature should be kept at 280° F. or less to prevent an excessive color formation rate.

As soon as the desired color is formed (generally 90 minutes after sealing the vessel), the reaction is stopped, flash cooled, and the components transferred into an open cold tank where water may be added if necessary. The pH is then adjusted to 2.4-3.4 with base.

The caramel color can be a wide variety of different intensities, depending upon the cooking length temperature and catalyst concentration. For example, a caramel color having an intensity of 0.100, also referred to as a single strength caramel, can be formed using shorter cooking times. Double strength caramels having color intensity of 0.205 to 0.250 with low 4-MeI can also be easily achieved.

The above method reduces the formation of 4-MeI, maintaining the 4-MeI content less than 20 ppm, and generally less than 15 ppm, and even 5 ppm or less. Particularly with a single strength caramel, the 4-MeI content will be less than 5. Shelf stability is also an issue with the caramel color. As described below, the formed caramel color has excellent shelf stability.

The present invention will be further appreciated in light of the following detailed examples.

EXAMPLE 1

In a first embodiment of the present invention, the ammonia content of the ammonium bisulfite is reduced and the concentration of SO2 is increased. Typically, in the manufacture of Class IV caramel, the $SO_2$ content of the ammonium bisulfite solution is less than 46%, and the ammonia content is greater than 14%, providing a pH of 5.5 or higher. According to this example, the ammonia content of the ammonium bisulfite solution was reduced to about 13.2% with a sulfur dioxide content of about 47.5% with the remainder being water. Forty pounds of corn syrup was combined with 11.47 lbs of the ammonium bisulfite and 9 lbs of water. This was heated over three hours and 15 minutes from an initial temperature of 140 degrees Fahrenheit at atmospheric pressure up to 280 degrees at 60 psi. The reactant mixture was flash-cooled. The starting specific gravity was 1.352 and the starting pH was 4.65. The final specific gravity is 1.272 and the formed caramel had the following characteristics:

TABLE 1

| Color | |
|---|---|
| @610 | 0.230 |
| @560 | 0.374 |
| @510 | 0.604 |
| pH | 3.20 |
| Viscosity (30 C.) | 58 cPs (This test is for shelf life of the product itself) |
| Haze and Gel | Pass |
| | 165 Minutes+ (This test is for stability in phosphoric acid.) |
| 4-MeI | 16 ppm |
| SO2 | 768 ppm |
| Resinification | 20 hours (This is a shelf life test.) |

This first reaction was repeated with the maximum pressure reaching 56 psi, providing a caramel content with similar characteristics to that shown in the first run, but with a 4-MeI content of 7 ppm.

EXAMPLE 2

In a second embodiment, Class IV caramel is formed by reacting a mixture of ammonium bisulfite, 9.4 lbs and sodium metabisulfite 3.5 lbs, (which is approximately 80% of the ammonium bisulfite, and 20% of the sodium metabisulfite based on percent sulfur dioxide), 40 lbs of corn syrup and 9 lbs of water, reaching a maximum temperature of 287 degrees and a maximum pressure of 62 psi. The initial specific gravity was 1.369 and the initial pH was 4.33. The formed caramel had a 4-MEI content of 15 ppm. The $SO_2$ concentration of the final product was 1064 ppm as compared to 768 and 765 respectively in the first two examples. The resinification of the produced caramel increased to 48 hours.

EXAMPLE 3

Fifty pounds of corn-derived glucose DE-80 was blended with 13 lbs of water and 15 lbs of ammonium bisulfite (70% solution), and 1.9 lbs phosphoric acid (85%) at 150° F. in the cooker. The starting specific gravity was 1.34 and the initial pH was 3.79. The cooker was heated using steam and the vent was closed upon reaching 180° F. Cooking times are reported in Table 2 below. At 250° F., 0.65 lbs of ammonium hydroxide (29.4%) was added over a period of 30 min. The reaction continued at 280° F. for a total time of about 2 hours. After flash cooling, the color index was 0.239 and the specific gravity of 1.263 and the pH 1.50. The formed caramel was combined with 1.85 lbs of sodium hydroxide (50% solution) and 1 lb of water.

TABLE 2

| Time | Temp (° F.) | Pressure | Color (CI) |
|---|---|---|---|
| 9:10 | 150 | 0 | |
| 9:44 | 250 | 88 | Injection started |
| 10:13 | 274 | 60 | Injection completed 0.65 lbs (29.4% NH4OH |
| 10:23 | 280 | 60 | Steam off |
| 10:30 | 280 | 60 | |
| 10:50 | 280 | 60 | |
| 11:05 | 280 | 60 | |
| 11:13 | Flash/Cool | 185 | 1.85 lbs caustic with 1.0 lbs water added |

The end product had a color index of 0.228, specific gravity of 1.2618, pH of 3.24, viscosity of 30 cPs, a negative mercaptan test, resinification of 21 hours and 4-MeI content of 10 ppm.

EXAMPLE 4

Fifty pounds of corn glucose DE-80 was combined with 10 lbs of water, 15.6 lbs of ammonium bisulfite (70% solution) and, subsequently, 1.5 lbs of 85% phosphoric acid. This was combined in a cooker at 150° F. The initial specific gravity was 1.363 and the initial pH was 4.11. This was heated, as shown in the following Table. At 180° F., the vent was closed. At 250° F., the addition of ammonium hydroxide, 0.63 pounds combined with 0.5 lb of water was initiated and completed over a period of 30 min, as shown in the Table. The reaction was continued, as shown, and flash cooled.

TABLE 3

| Time | Temp (° F.) | Pressure | Material |
|---|---|---|---|
| 7:52 | 150 | 0 | |
| 7:58 | 180 | | Closed vent |
| 8:20 | 250 | 34 | Injection started |
| 9:10 | 280 | 60 | Injection completed |
| 9:15 | 280 | 60 | |
| 9:25 | 280 | 60 | |
| 9:35 | 280 | 60 | |

TABLE 3-continued

| Time | Temp (° F.) | Pressure | Material |
|------|-------------|----------|----------|
| 9:41 | 280 | 60 | |
| 9:41 | Flash/Cool | | 2.5 lbs KOH; 4½ lbs water |

The end product had a color index of 0.254, specific gravity of 1.272, and a pH 1.48. This was combined with 2.5 lbs of potassium hydroxide (45%) and 4.5 lbs of water to achieve a specific gravity of 1.272; a color index of 0.243, a pH of 2.72; a resinification of 21 hours; a 4-MeI content of 16 ppm.

These Examples demonstrate that the present invention enables one to achieve 4-MeI contents of less than 20, while achieving a color index in excess of 0.200, thus manufacturing double strength caramel.

This has been a description of the present invention along with the preferred method of practicing the present invention. However, the invention itself should only be defined by the appended claims.

Wherein we claim:

1. A method of forming ammonium bisulfite caramel comprising:
    blending a carbohydrate with a catalyst to form a blend said catalyst comprising ammonium bisulfite and optionally an acid, said catalyst having a pH effective to form said blend having an initial pH of less than 5, said blend having a temperature less than 250° F.;
    subsequent to establishing said initial pH, heating said blend in a closed reaction vessel to a temperature of at least 250° Fahrenheit; and
    maintaining said temperature of said blend to complete caramel formation to form a class IV caramel having a color intensity of at least 0.200 and a 4-MeI content less than 25 ppm.

2. The method claimed in claim 1 wherein said initial pH is established at less than 4.5.

3. The method claimed in claim 2 wherein said initial pH is established by adding an acid selected from the group consisting of phosphoric acid, phosphorous acid, sulfuric acid, sulfurous acid and sodium metabisulfite, and mixtures thereof to said blend.

4. The method claimed in claim 2 wherein base is added to said blend during heating to slow color formation and prevent formation of insoluble caramel.

5. The method claimed in claim 1 wherein said carbohydrate is glucose.

6. The method claimed in claim 5 wherein said glucose is selected from the group consisting of corn syrup and wheat syrup, and mixtures thereof.

7. The method claimed in claim 3 wherein said acid is added to said carbohydrate prior to addition of said ammonium bisulfite.

8. The method claimed in claim 1 wherein said caramel has a 4-Mel content of less than 15 ppm.

9. The method claimed in claim 1 wherein said initial pH is established at from 2-4.

10. The method claimed in claim 6 wherein said acid is selected from the group consisting of phosphorus acid, phosphoric acid sulfurous acid, sulfuric acid, sodium metabisulfite, and mixtures thereof.

11. A method of forming class IV caramel having a color intensity at 610 nm of at least 0.200 and a 4-Mel content less than 20 ppm comprising:
    blending glucose with an acid selected from the group consisting of phosphoric acid, phosphorous acid, sulfuric acid, sulfurous acid, and ammonia metabisulfite and mixtures thereof to establish a pH of 2-4;
    adding ammonium bisulfite to said glucose in an amount effective to catalyze formation of caramel IV having an intensity of at least 0.200 at 610 nm wherein said pH is maintained between 2-4 at a temperature less than 250° F.; and
    subsequently heating said glucose at autogenous pressure to 250° F.-290° F. for a time effective to form said caramel color having a 4-Mel content less than 20 ppm.

12. A method of forming class IV caramel having a color intensity at 610 nm of at least 0.010 and a 4-Mel content less than 5 ppm comprising:
    blending glucose with an acid selected from the group consisting of phosphoric acid, phosphorous acid, sulfuric acid, sulfurous acid, sodium metabisulfite, and mixtures thereof to establish a pH of 2-4;
    subsequently adding ammonium bisulfite to said glucose in an amount effective to catalyze formation of caramel IV having an intensity of 0.010-0.170 at 610 nm wherein said pH is maintained between 2-4 at a temperature less than 250° F.; and
    heating said glucose at autogenous pressure to 250° F.-290° F. for a time effective to form said caramel color having a 4-Mel content less than 10 ppm.

13. The method claimed in claim 1 wherein said ammonium bisulfite has an ammonia content less than 14% by weight and a sulfur dioxide content greater than 46% by weight.

* * * * *